(12) United States Patent
Bollman (10) Patent No.: US 10,396,417 B2
(45) Date of Patent: Aug. 27, 2019

(54) BATTERY ARRANGMENTS FOR GAS TURBINE ENGINES (71) Applicant: Rolls-Royce Corporation, Indianapolis, IN (US)

(72) Inventor: Andrew Bollman, Plainfield, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 578 days.

(21) Appl. No.: 15/179,654

(22) Filed: Jun. 10, 2016

(65) Prior Publication Data
US 2017/0062886 A1 Mar. 2, 2017

Related U.S. Application Data

(60) Provisional application No. 62/174,792, filed on Jun. 12, 2015.

(51) Int. Cl.
| | |
|---|---|
| *H01M 10/663* | (2014.01) |
| *F02C 7/32* | (2006.01) |
| *H01M 10/39* | (2006.01) |
| *H01M 10/625* | (2014.01) |
| *H01M 10/615* | (2014.01) |
| *H01M 10/613* | (2014.01) |
| *H01M 10/635* | (2014.01) |
| *B64D 27/16* | (2006.01) |
| *F01D 25/24* | (2006.01) |
| *F01D 25/28* | (2006.01) |

(Continued)

(52) U.S. Cl.
CPC .......... *H01M 10/663* (2015.04); *B64D 27/16* (2013.01); *F01D 25/24* (2013.01); *F01D 25/28* (2013.01); *F02C 7/32* (2013.01); *H01M 10/0525* (2013.01); *H01M 10/06* (2013.01); *H01M 10/39* (2013.01); *H01M 10/46* (2013.01); *H01M 10/613* (2015.04); *H01M 10/615* (2015.04); *H01M 10/625* (2015.04); *H01M 10/635* (2015.04); *H02J 7/007* (2013.01); *F05D 2220/323* (2013.01); *F05D 2240/91* (2013.01); *F05D 2260/20* (2013.01); *F05D 2260/42* (2013.01); *F05D 2260/85* (2013.01); *H01M 2220/20* (2013.01); *Y02T 50/672* (2013.01); *Y02T 50/675* (2013.01)

(58) Field of Classification Search
CPC .................................................... H01M 10/663
USPC ........................................................... 320/101
See application file for complete search history.

(56) References Cited

U.S. PATENT DOCUMENTS

| 6,027,076 A | * | 2/2000 | Krause | .................. | B64G 1/425 244/158.1 |
| 6,819,237 B2 | * | 11/2004 | Wilson | .................. | G08B 17/00 169/46 |

(Continued)

OTHER PUBLICATIONS

Search Report issued by the Intellectual Property Office of Great Britain in connection with Application No. GB1601909.3, dated Mar. 18, 2016, 1 page.

*Primary Examiner* — Drew A Dunn
*Assistant Examiner* — Jerry D Robbins
(74) *Attorney, Agent, or Firm* — Barnes & Thornburg LLP (57) ABSTRACT

A battery arrangement for a gas turbine engine, the battery arrangement comprising: a wall of the gas turbine engine; a thermal battery coupled to the wall and arranged to receive thermal energy from gas of the gas turbine engine; and charging circuitry configured to supply electrical energy to the thermal battery to recharge the thermal battery.

13 Claims, 7 Drawing Sheets

(51) Int. Cl.
*H01M 10/0525* (2010.01)
*H01M 10/06* (2006.01)
*H01M 10/46* (2006.01)
*H02J 7/00* (2006.01)

(56) References Cited

U.S. PATENT DOCUMENTS

| | | | | |
|---|---|---|---|---|
| 7,871,447 | B2* | 1/2011 | Dixon | H01M 6/36 |
| | | | | 29/623.1 |
| 8,167,070 | B2* | 5/2012 | Takamura | B60K 1/04 |
| | | | | 180/68.2 |
| 9,382,675 | B2* | 7/2016 | Frelich | E01C 19/4853 |
| 2002/0025471 | A1* | 2/2002 | Velez | H01M 2/0277 |
| | | | | 429/112 |
| 2010/0330403 | A1* | 12/2010 | Normann | B60L 11/1875 |
| | | | | 429/62 |
| 2011/0206951 | A1 | 8/2011 | Ford et al. | |
| 2011/0283712 | A1* | 11/2011 | Brillet | B64D 41/00 |
| | | | | 60/801 |
| 2012/0000204 | A1* | 1/2012 | Kesseli | F02C 3/107 |
| | | | | 60/778 |
| 2015/0020531 | A1* | 1/2015 | Hanebuth | F02C 6/14 |
| | | | | 60/805 |

* cited by examiner

BATTERY ARRANGMENTS FOR GAS TURBINE ENGINES

CROSS REFERENCE TO RELATED APPLICATIONS

This application claims priority to and the benefit of U.S. Provisional Patent Application No. 62/174,792, filed 12 Jun. 2015, the disclosure of which is now expressly incorporated herein by reference.

FIELD OF THE DISCLOSURE

The present disclosure concerns battery arrangements for gas turbine engines.

BACKGROUND

Aircraft, such as airliners, usually include one or more batteries for supplying electrical energy to components of the aircraft. For example, an airliner may comprise one or more Lithium-ion or lead acid batteries for supplying electrical energy to an auxiliary power unit (APU) to start the auxiliary power unit. The batteries may be recharged during operation of the aircraft by a generator coupled to an auxiliary gearbox of a gas turbine engine In some instances, the power density of such batteries may not be sufficiently high to power some components of the aircraft. For example, a Lithium ion or lead acid battery may not have a sufficiently high power density to power critical loads of an aircraft during flight, such as, pumps, controls, or to restart a gas turbine engine in the event of a system failure. In order to provide sufficient electrical power, the aircraft may comprise a plurality of such batteries electrically connected in series to one another. However, this may increase the weight of the aircraft and thereby reduce the fuel efficiency of the aircraft.

SUMMARY

According to various, but not necessarily all, embodiments there is provided a battery arrangement for a gas turbine engine, the battery arrangement comprising: a wall of the gas turbine engine; a thermal battery coupled to the wall and arranged to receive thermal energy from gas of the gas turbine engine; and charging circuitry configured to supply electrical energy to the thermal battery to recharge the thermal battery.

The wall may define an annulus having a longitudinal axis, the at least one support member may be arranged to position the thermal battery to intersect the longitudinal axis of the wall.

The thermal battery may be coupled to the wall by being embedded within the wall of the gas turbine engine.

The wall may define an annulus having a longitudinal axis. The thermal battery may define a ring shape extending around the longitudinal axis.

The battery arrangement may further comprise a component of an aircraft. The thermal battery may be electrically connected to the component of the aircraft and may be configured to provide electrical energy to the component.

The component of the aircraft may comprise one or more fans for providing thrust to the aircraft.

The battery arrangement may further comprise a generator of the gas turbine engine. The charging circuitry may be electrically connected to the generator of the gas turbine engine.

The battery arrangement may further comprise a controller configured to control the flow of cooling gas to the thermal battery.

The battery arrangement may further comprise: a sensor configured to sense a temperature of the thermal battery. The controller may be configured to receive the sensed temperature of the thermal battery and to control the flow of cooling gas to the thermal battery using the received sensed temperature.

The controller may be configured to: receive a signal indicating that the thermal battery is to revert to an inert state; and to control the flow of cooling gas to the thermal battery using the received signal to reduce the temperature of the thermal battery to deactivate the thermal battery.

According to various, but not necessarily all, embodiments there is provided a gas turbine engine comprising a battery arrangement as described in any of the preceding paragraphs.

According to various, but not necessarily all, embodiments there is provided an aircraft comprising a battery arrangement as described in any of the preceding paragraphs.

According to various, but not necessarily all, embodiments there is provided a method of controlling a temperature of the thermal battery of the battery arrangement as described in any of the preceding paragraphs, the method comprising: controlling the flow of cooling gas to the thermal battery.

The method may further comprise: receiving a sensed temperature of the thermal battery; and controlling the flow of cooling gas to the thermal battery using the received sensed temperature.

The method may further comprise: receiving a signal indicating that the thermal battery is to revert to an inert state; and controlling the flow of cooling gas to the thermal battery using the received signal to reduce the temperature of the thermal battery to deactivate the thermal battery.

According to various, but not necessarily all, embodiments there is provided a computer program that, when read by a computer, causes performance of the method as described in any of the preceding paragraphs.

According to various, but not necessarily all, embodiments there is provided a non-transitory computer readable storage medium comprising computer readable instructions that, when read by a computer, cause performance of the method as described in any of the preceding paragraphs.

The skilled person will appreciate that except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DRAWINGS

In the following description, the terms "connect" or "coupled" mean operationally connected and coupled. It should be appreciated that there may be any number of intervening components between the mentioned features, including no intervening components.

Figure 1:
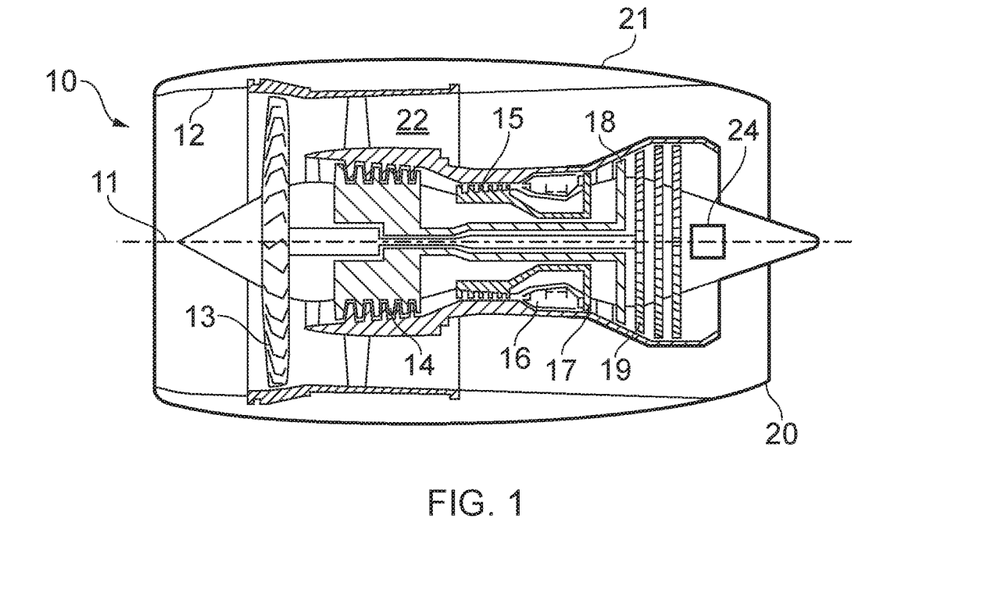
FIG. 1 illustrates a cross sectional side view of a gas turbine engine according to various examples.

FIG. 1 illustrates a cross sectional side view of a gas turbine engine 10 having a principal and rotational axis 11. The gas turbine engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 operates so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

The gas turbine engine 10 also comprises a battery arrangement 24 that is described in greater detail in the following paragraphs. It should be appreciated that the battery arrangement 24 may be any of the battery arrangements 241, 242, 243 illustrated in FIGS. 2, 3A, 3B, 4A, 4B and 5 and described in the paragraphs below.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan. By way of another example, the gas turbine engine may be a radial engine.

Figure 2:
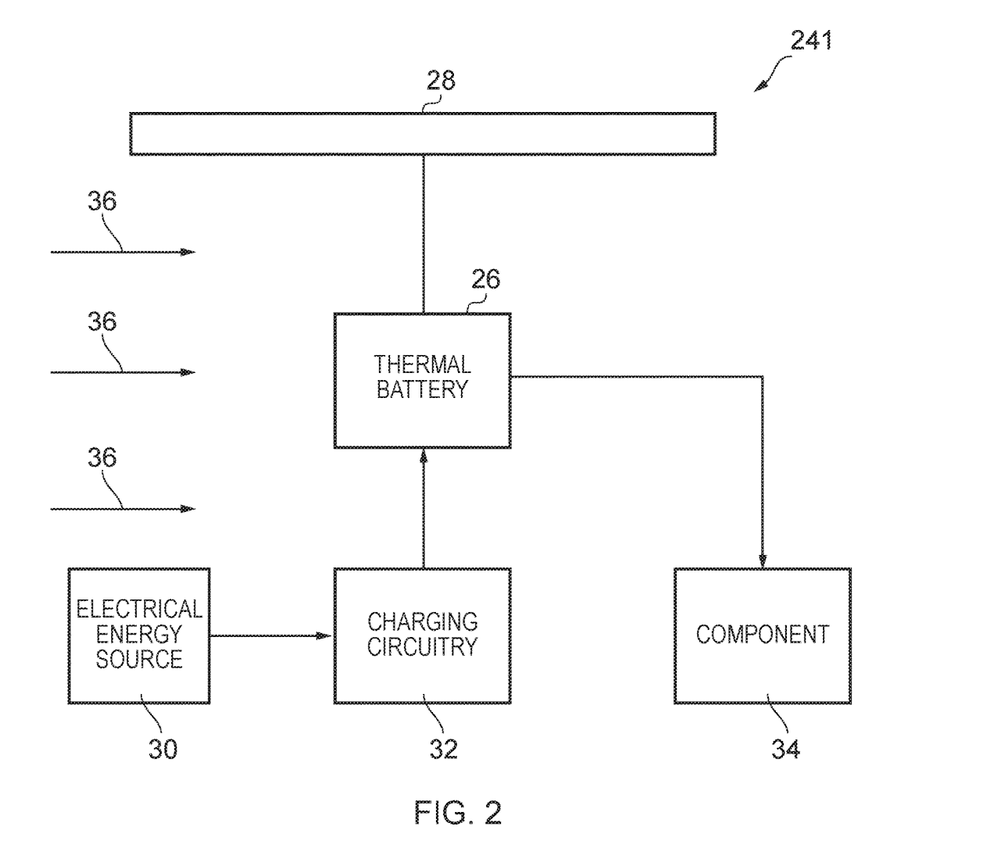
FIG. 2 illustrates a schematic diagram of a battery arrangement according to various examples.

FIG. 2 illustrates a battery arrangement 241 comprising a thermal battery 26, a wall 28, an electrical energy source 30, charging circuitry 32 and a component 34. In some examples, the battery arrangement 241 may be a module. As used herein, the wording 'module' refers to an apparatus or arrangement where one or more features are included at a later time, and possibly, by another manufacturer or by an end user. For example, where the battery arrangement 241 is a module, the battery arrangement 241 may only include the thermal battery 26, the wall 28 and the charging circuitry 32, and the remaining features (that is, the electrical energy source 30 and the component 34) may be added by another manufacturer.

The thermal battery 26 may comprise any suitable thermal battery or any combination of suitable thermal batteries. For example, the thermal battery 26 may comprise one or more of: an Li—Al/FES2 battery, an LiSi/FES2 battery, and an Li/CoS2 battery. The thermal battery 26 is coupled to the wall 28 and is arranged to receive thermal energy from gas 36 of the gas turbine engine 10.

The thermal battery 26 has an activation temperature which may be between three hundred Celsius and five hundred Celsius, for example. When the thermal battery 26 has a temperature below the activation temperature, the thermal battery 26 may store energy, but is inert and cannot supply or receive electrical energy. When the thermal battery 26 has a temperature above the activation temperature, the thermal battery 26 is active and is able to supply and receive electrical energy.

The wall 28 may comprise any casing or part of a casing of the gas turbine engine 10. In some examples, the wall 28 may comprise at least a part of the turbine casing of the gas turbine engine 10. The wall 28 may define an annulus (or a part of an annulus) and have a longitudinal axis (which may be the same as the axis 11 of the gas turbine engine 10). The wall 28 may comprise any suitable material and may comprise a metal and/or a composite material.

The electrical energy source 30 may comprise any device for supplying electrical energy to the charging circuitry 32. For example, the electrical energy source 30 may comprise a generator connected to an auxiliary gearbox of the gas turbine engine 10. By way of another example, the electrical energy source 30 may comprise one or more batteries (such as lead acid batteries or Lithium-ion batteries) that may be charged by a generator connected to an auxiliary gearbox of the gas turbine engine 10 and/or by a power electronics source such as a direct current to direct current (dc-dc) converter or rectifier.

The charging circuitry 32 is configured to receive electrical energy from the electrical energy source 30 and to provide the received electrical energy to the thermal battery 26. The charging circuitry 32 may comprise any suitable circuitry for converting the electrical output from the electrical energy source 30 into a suitable electrical input for charging the thermal battery 26.

The component 34 may include any suitable apparatus, device, or system that is configured to consume electrical energy. For example, the component 34 may comprise one or more fans that are arranged along the wings of an aircraft to provide propulsive thrust to the aircraft (that is, the fans 34 may be part of a distributed propulsion system for an aircraft). By way of another example, the component 34 may comprise a gas turbine engine of the aircraft. By way of a further example, the component 34 may comprise a pump arrangement.

During operation of the gas turbine engine 10, the thermal energy received by the thermal battery 26 from the gas may heat the thermal battery 26 above its activation temperature. When the thermal battery 26 has a temperature above the activation temperature, the thermal battery 26 may supply electrical energy to the component 34. Additionally, when the thermal battery 26 has a temperature above the activation temperature, the thermal battery 26 may store electrical energy received from the charging circuitry 32 (in other words, above the activation temperature, the thermal battery 26 may be charged/recharged by the charging circuitry 32).

Figure 3A:
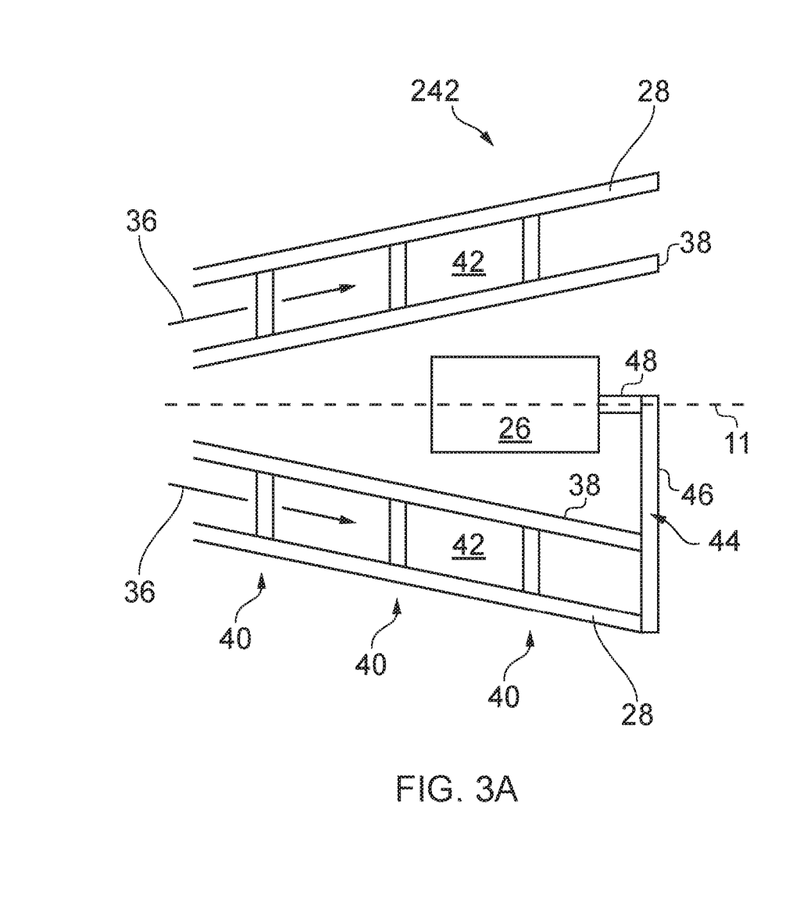
FIG. 3A illustrates a cross sectional side view of another battery arrangement according to various examples.
Figure 3B:
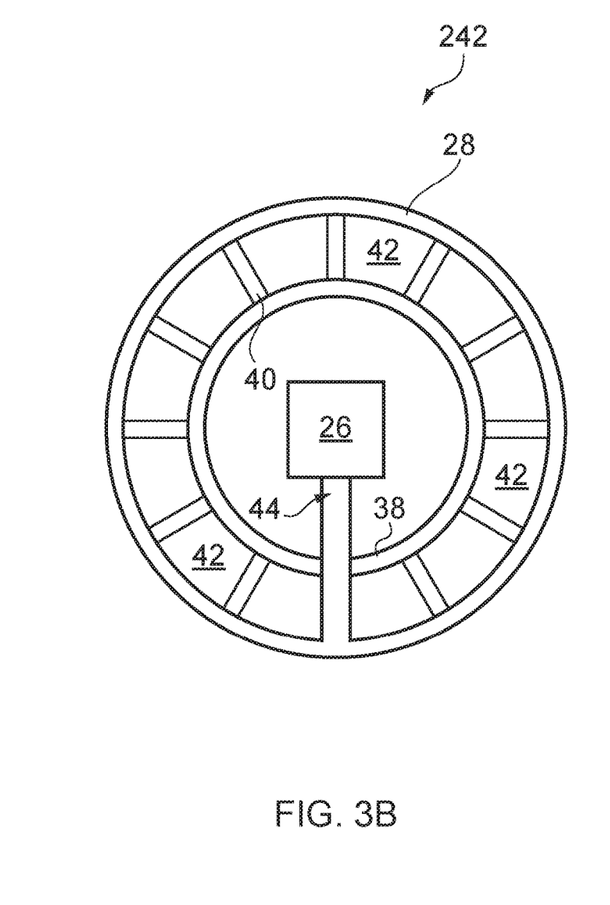
FIG. 3B illustrates a front view of the battery arrangement illustrated in FIG. 3A.

FIGS. 3A & 3B illustrate another battery arrangement 242 according to various examples. The battery arrangement 242 is similar to the battery arrangement 241 and where the features are similar; the same reference numerals are used.

The battery arrangement 242 is positioned at a turbine of the gas turbine engine 10. The turbine may be any one of the high pressure turbine 17, the intermediate pressure turbine 18, and the low pressure turbine 19. The turbine includes a turbine disc 38, one or more stages of turbine blades 40 and a turbine casing 28. The turbine disc 38 and the turbine casing 28 are concentrically arranged so that the turbine disc 38 is positioned within the turbine casing 28 and define a conduit 42 there between for receiving gas (for example, from the combustion equipment 16, or from another turbine). The turbine disc 38 and the turbine casing 28 each define an annulus having a longitudinal axis 11 (that is, the longitudinal axis of the turbine disc 38 and the turbine casing 28 is the same as the axis 11 of the gas turbine engine 10). The turbine blades 40 extend radially outwards from the turbine disc 38 and into the conduit 42.

The battery arrangement 242 includes at least one support member 44 arranged to support the thermal battery 26 within the turbine disc 38 and to couple the thermal battery 26 to the turbine casing 28. In the illustrated example, the battery arrangement 242 includes a single support member 44 that comprises a first part 46 that extends radially inwards from the turbine casing 28, and a second part 48 that extends axially towards the combustion equipment 16 from the first part 46. The support member 44 is arranged to position the thermal battery 26 to intersect the longitudinal axis 11 of the turbine casing 28 and the turbine disc 38. In other words, the support member 44 is arranged to position the thermal battery 26 along the centre line of the gas turbine engine 10. It should be appreciated that the battery arrangement 242 may comprise any number of support members 44 and that the support members 44 may have alternative configurations.

The thermal battery 26 may therefore be arranged to indirectly receive thermal energy from the gas 36 flowing through the turbine. In particular, during operation of the gas turbine engine 10, the turbine disc 38 is heated by the gas 36 flowing through the turbine. The turbine disc 38 then radiates the thermal energy received from the gas 36 to the thermal battery 26. Where the thermal battery 26 is heated above the activation temperature, the thermal battery 26 may provide electrical energy to the component 34 and store electrical energy received from the charging circuitry 32.

Figure 4A:
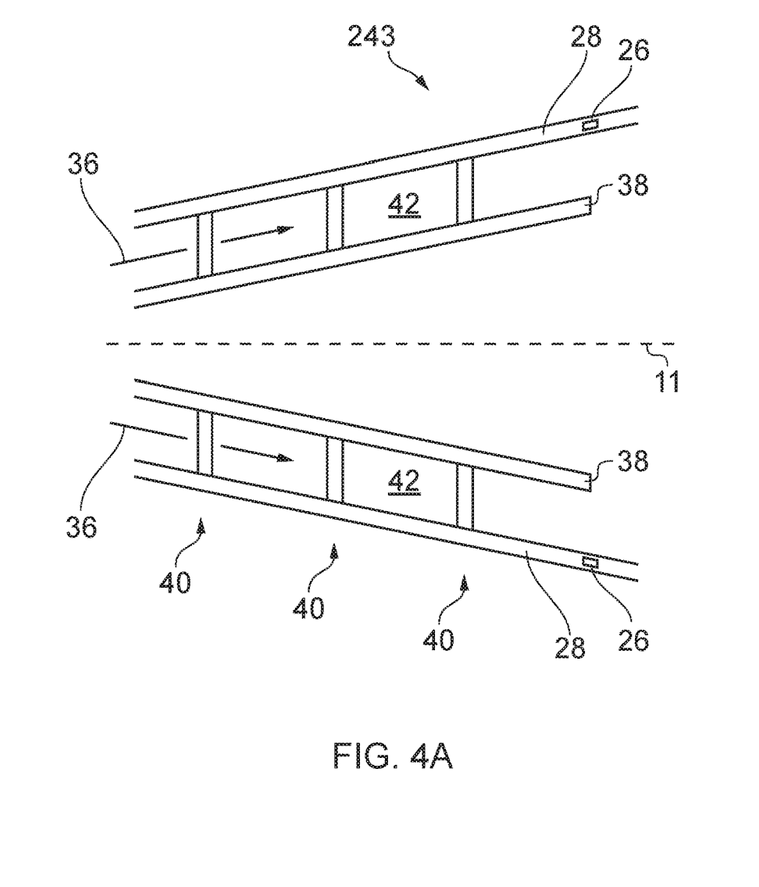
FIG. 4A illustrates a cross sectional side view of a further battery arrangement according to various examples.
Figure 4B:
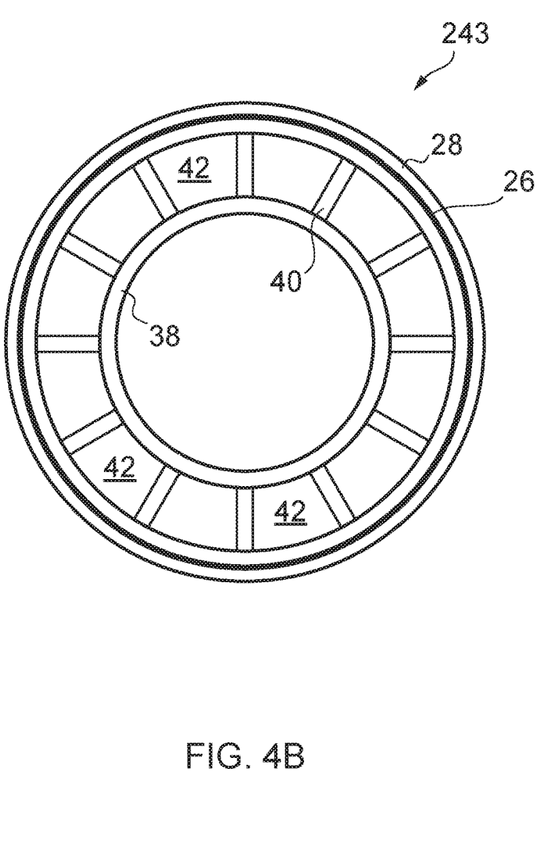
FIG. 4B illustrates a front view of the battery arrangement illustrated in FIG. 4A.

FIGS. 4A & 4B illustrate a further battery arrangement 243 according to various examples. The battery arrangement 243 is similar to the battery arrangement 242 and where the features are similar; the same reference numerals are used.

The battery arrangement 243 differs from the battery arrangement 242 in that the battery arrangement 243 does not include support members 44 for mounting the thermal battery 26 along the centre line of the gas turbine engine 10. Instead, the thermal battery 26 is coupled to the turbine casing 28 by being embedded within the turbine casing 28.

The thermal battery 26 may be embedded within the turbine casing 28 so that an intervening part of the turbine casing 28 is positioned between the thermal battery 26 and the conduit 42 (as illustrated in FIGS. 4A and 4B). In these examples, the thermal battery 26 indirectly receives thermal energy from the gas 36 through thermal conduction via an intervening part of the turbine casing 28. Where the thermal battery 26 is embedded within the turbine casing 28 and defines an interior surface of the turbine casing 28 (that is, there is no intervening part of the turbine casing 28 between the thermal battery 26 and the conduit 42), the thermal battery 26 may directly receive thermal energy from the gas 36.

Figure 5:
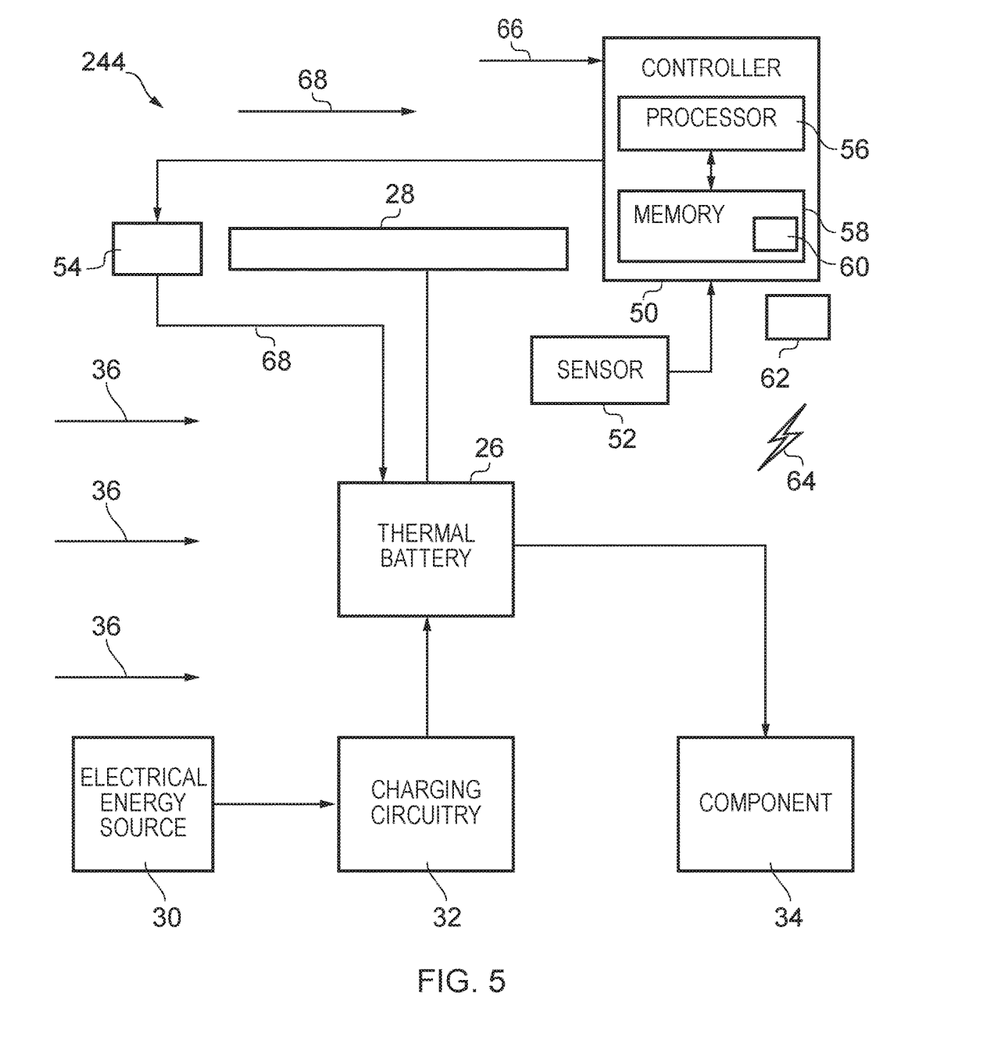
FIG. 5 illustrates a schematic diagram of another battery arrangement according to various examples.

FIG. 5 illustrates another battery arrangement 244 according to various examples. The battery arrangement 244 is similar to the battery arrangement 241 and where the features are similar, the same reference numerals are used. The battery arrangement 244 differs from the battery arrangement 241 in that the battery arrangement 244 further comprises a controller 50, a sensor 52, and a valve 54.

The controller 50, the sensor 52 and the valve 54 may be coupled to one another via wireless links and may consequently comprise transceiver circuitry and one or more antennas. Additionally or alternatively, the controller 50, the sensor 52 and the valve 54 may be coupled to one another via wired links and may consequently comprise interface circuitry (such as one or more sockets for cabling). It should be appreciated that the controller 50, the sensor 52, and the valve 54 may be coupled to one another via any combination of wired and wireless links.

Figure 6:
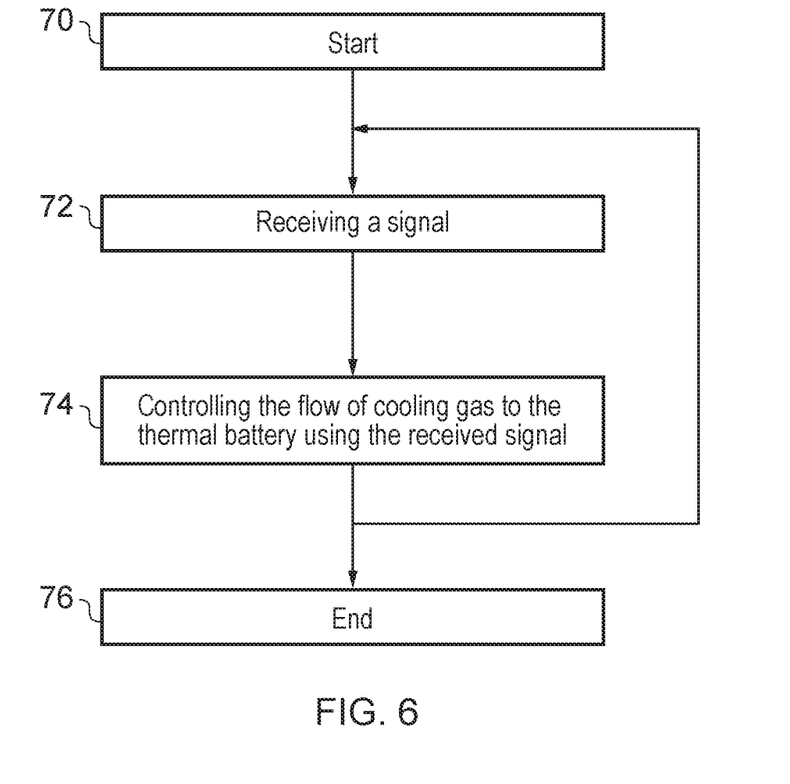
FIG. 6 illustrates a flow diagram of a method of controlling a temperature of a thermal battery of a battery arrangement according to various examples.

The controller 50 may comprise any suitable circuitry to cause performance of the methods described herein and as illustrated in FIG. 6. The controller 50 may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

By way of an example, the controller 50 may comprise at least one processor 56 and at least one memory 58. The memory 58 stores a computer program 60 comprising computer readable instructions that, when read by the processor 56, causes performance of the methods described herein, and as illustrated in FIG. 6. The computer program may be software or firmware, or may be a combination of software and firmware.

The processor 56 may include at least one microprocessor and may comprise a single core processor or may comprise multiple processor cores (such as a dual-core processor, a quad-core processor, or an octo-core processor). The processor 56 may comprise a plurality of processors (at least one of which may comprise multiple processor cores).

The memory 58 may be any suitable non-transitory computer readable storage medium, data storage device or devices, and may comprise a hard disk and/or solid state memory (such as flash memory). The memory 58 may be permanent non-removable memory, or may be removable memory (such as a universal serial bus (USB) flash drive).

The computer program 60 may be stored on a non-transitory computer readable storage medium 62. The computer program 60 may be transferred from the non-transitory computer readable storage medium 62 to the memory 58. The non-transitory computer readable storage medium 62 may be, for example, a Universal Serial Bus (USB) flash drive, a compact disc (CD), a digital versatile disc (DVD) or a Blu-ray disc. In some examples, the computer program 60 may be transferred to the memory 58 via a signal 64 (such as a wireless signal or via a wired signal).

The controller 50 is configured to receive a signal 66 indicating that the thermal battery 26 is to revert to an inert state. For example, the controller 50 may be configured to receive the signal 66 from a user input device of the aircraft (such as a button, or a touchscreen within the cockpit of the aircraft). By way of another example, the controller 50 may be configured to receive the signal 66 from a controller of the aircraft.

The sensor 52 may be any suitable device that is configured to sense a temperature of the thermal battery 26. For example, the sensor 52 may be any suitable thermometer, pyrometer or bolometer. The sensor 52 may be mounted on the thermal battery 26 or may be positioned remote from the thermal battery 26. The controller 50 is configured to receive data for the sensed temperature of the thermal battery 26 from the sensor 52.

The valve 54 may be any suitable device or apparatus for controlling the flow of cooling gas (such as bleed air) to the thermal battery 26. For example, the valve 54 may be arranged within a casing of the gas turbine engine 10 for controlling the flow of bypass air 68 (or air exterior to the gas turbine engine 10) to the thermal battery 26. The controller 50 is configured to control the valve 54 to provide cooling gas to the thermal battery 26. The valve 54 may comprise circuitry (such as a controller and an actuator) for controlling the configuration of the valve 54 (that is, to what extent the valve 54 is open or closed).

The operation of the battery arrangement 244 is described in the following paragraphs with reference to FIG. 6.

At block 70, the process starts. For example, the controller 50 may commence the process in response to a user input signal from a user input device within the cockpit of an aircraft. By way of another example, the controller 50 may commence the process in response to a signal from a controller of the gas turbine engine 10.

At block 72, the method includes receiving a signal. For example, the controller 50 may receive a signal from the sensor 52 for the sensed temperature of the thermal battery 26. By way of another example, the controller 50 may receive a signal 66 indicating that the thermal battery 26 is to revert to an inert state.

At block 74, the method includes controlling the flow of cooling gas to the thermal battery using the signal received at block 72.

Where the signal received at block 72 includes data for the sensed temperature of the thermal battery 26, the controller 50 may control the valve 54 to provide a predetermined flow rate of cooling gas to the thermal battery 26. For example, where the gas flowing through the turbine has a relatively high temperature (that may damage or destroy the thermal battery), the controller 50 may control the valve 54 to provide a higher flow rate of cooling gas to the thermal battery 26. By way of another example, where the gas flowing through the turbine has a relatively low temperature (that is only slightly above the activation temperature of the thermal battery 26), the controller 50 may control the valve 54 to provide a lower (or zero) flow rate of cooling gas to the thermal battery 26.

Where the signal received at block 72 includes data indicating that the thermal battery 26 is to revert to an inert state, the controller 50 may control the valve 54 to provide a predetermined flow rate of cooling gas to the thermal battery 26 to reduce the temperature of the thermal battery 26 to below the activation temperature of the thermal battery 26. Consequently, the controller 50 may be configured to deactivate the thermal battery 26 and thereby return the thermal battery 26 to its inert state.

The method may then return to block 72 and the controller 50 may receive another signal for controlling the configuration of the valve 54. Alternatively, the method may move to block 76 and the process may then end.

Figure 7:
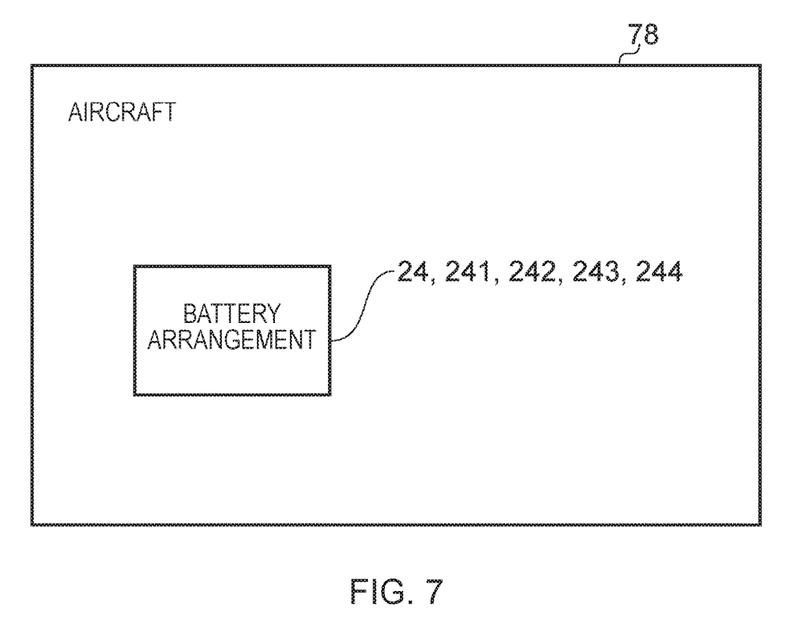
FIG. 7 illustrates a schematic diagram of an aircraft comprising a battery arrangement according to various examples.

FIG. 7 illustrates a schematic diagram of an aircraft 78 comprising one or more of the battery arrangements 24, 241, 242, 243, 244. The aircraft 78 may be any aircraft and may be a helicopter or an airliner having a distributed propulsion system for example.

The battery arrangement 24, 241, 242, 243, 244 may provide several advantages. First, the thermal battery 26 may be activated using thermal energy from the gas 36 (exhaust gas from combustion equipment 16 or from a turbine) flowing through the gas turbine engine 10. This advantageously enables the thermal battery 26 to be recharged during operation of the gas turbine engine 10 and allows repeated use of the thermal battery 26. Consequently, the thermal battery 26 may not require a dedicated heating source to enable charging of the thermal battery 26. Second, the thermal battery 26 has a relatively high electrical power density (relative to a Lithium ion battery for example) and is smaller and more stable than capacitive energy storage. Furthermore, the thermal battery 26 may be lighter than a lithium ion battery and require lower maintenance (since a thermal battery may be certified for use for twenty five to thirty years and therefore has a longer time period between being replaced than a Lithium ion battery). Third, the controller 50 may advantageously control the temperature of the thermal battery 26 to prevent the thermal battery 26 from being damaged or destroyed by the gas 36 and/or to return the thermal battery 26 to an inert state.

It will be understood that the invention is not limited to the embodiments above-described and various modifications and improvements can be made without departing from the concepts described herein. For example, the battery arrangement 24, 241, 242, 243, 244 may be positioned at a compressor (such as the high pressure compressor 15) of the gas turbine engine 10, and the thermal battery 26 may be arranged to receive thermal energy from gas passing through the compressor.

By way of another example, the battery arrangement 24, 241, 242, 243, 244 may be included within a turboshaft engine within a vessel (such as a ship) or within a turboshaft engine at a power plant.

By way of a further example, the charging circuitry 32 may include a bi-directional converter and the energy source 30 may include a direct current (dc) bus. In this configuration, the bus can be the source of charging the battery, or loads on the bus could be load components 34 when discharging the battery and the flow of electricity is controlled through the charging circuitry 32.

Except where mutually exclusive, any of the features may be employed separately or in combination with any other features and the disclosure extends to and includes all combinations and sub-combinations of one or more features described herein.

What is claimed is:

1. A battery arrangement for a gas turbine engine, the battery arrangement comprising:
   a wall of the gas turbine engine;
   a thermal battery coupled to the wall and arranged to receive thermal energy from gas of the gas turbine engine; and
   charging circuitry configured to supply electrical energy to the thermal battery to recharge the thermal battery, wherein the wall comprises at least a part of a turbine casing of the gas turbine engine and the battery arrangement further comprises at least one support member arranged to support the thermal battery within a turbine disc of the gas turbine engine and to couple the thermal battery to the turbine casing, wherein the wall defines an annulus having a longitudinal axis, the at least one support member is arranged to position the thermal battery to intersect the longitudinal axis of the wall.

2. The battery arrangement as claimed in claim 1, further comprising a component of an aircraft, wherein the thermal battery is electrically connected to the component of the aircraft and is configured to provide electrical energy to the component.

3. The battery arrangement as claimed in claim 2, wherein the component of the aircraft comprises one or more fans for providing thrust to the aircraft.

4. The battery arrangement as claimed in claim 1, further comprising a generator of the gas turbine engine, the charging circuitry being electrically connected to the generator of the gas turbine engine.

5. The battery arrangement as claimed in claim 1, further comprising: a controller configured to control the flow of cooling gas to the thermal battery.

6. The battery arrangement as claimed in claim 5, further comprising: a sensor configured to sense a temperature of the thermal battery, the controller being configured to receive the sensed temperature of the thermal battery and to control the flow of cooling gas to the thermal battery using the received sensed temperature.

7. The battery arrangement as claimed in claim 5, wherein the controller is configured to: receive a signal indicating that the thermal battery is to revert to an inert state; and to control the flow of cooling gas to the thermal battery using the received signal to reduce the temperature of the thermal battery to deactivate the thermal battery.

8. A gas turbine engine having a battery arrangement, the battery arrangement comprising:
   a wall of a turbine included in the gas turbine engine;
   a thermal battery coupled to the wall and arranged to receive thermal energy from gas of the gas turbine engine; and
   charging circuitry configured to supply electrical energy to the thermal battery to recharge the thermal battery,
   wherein the battery arrangement further comprises at least one support member arranged to support the thermal battery within a turbine disc of the gas turbine engine and to couple the thermal battery to the wall of the turbine and the turbine disc is configured to receive a plurality of turbine blades and to rotate about an axis during use of the gas turbine engine,
   wherein the wall defines an annulus having a longitudinal axis, the at least one support member is arranged to position the thermal battery to intersect the longitudinal axis of the wall.

9. An aircraft having a gas turbine engine including a battery arrangement, the battery arrangement comprising:
   a wall of the gas turbine engine;
   a thermal battery coupled to the wall and arranged to receive thermal energy from gas of the gas turbine engine; and
   charging circuitry configured to supply electrical energy to the thermal battery to recharge the thermal battery,
   wherein the wall comprises at least a part of a turbine casing of the gas turbine engine that is arranged circumferentially around a turbine disc and a plurality of turbine blades, the wall defines an annulus having a longitudinal axis that the turbine disc is configured to rotate about during use of the gas turbine engine, and the thermal battery is positioned to intersect the longitudinal axis.

10. A method of controlling a temperature of a thermal battery of a battery arrangement, the method comprising:
    providing an aircraft having a gas turbine engine including the battery arrangement, the battery arrangement including a wall of the gas turbine engine, the thermal battery coupled to the wall and arranged to receive thermal energy from gas of the gas turbine engine, and charging circuitry configured to supply electrical energy to the thermal battery to recharge the thermal battery; and
    controlling the flow of cooling gas to the thermal battery,
    wherein the wall of the gas turbine engine comprises at least a part of a turbine casing of the gas turbine engine and the battery arrangement further comprises at least one support member arranged to support the thermal battery within a turbine disc of the gas turbine engine and to couple the thermal battery to the turbine casing,
    wherein the wall defines an annulus having a longitudinal axis, the at least one support member is arranged to position the thermal battery to intersect the longitudinal axis of the wall.

11. The method as claimed in claim 10, further comprising:
    receiving a sensed temperature of the thermal battery; and
    controlling the flow of cooling gas to the thermal battery using the received sensed temperature.

12. The method as claimed in claim 11, further comprising:
    receiving a signal indicating that the thermal battery is to revert to an inert state; and
    controlling the flow of cooling gas to the thermal battery using the received signal to reduce the temperature of the thermal battery to deactivate the thermal battery.

13. A non-transitory computer readable storage medium comprising computer readable instructions that, when read by a computer, cause performance of the method as claimed in claim 10.

* * * * *